(12) United States Patent
Du et al.

(10) Patent No.: US 11,009,633 B2
(45) Date of Patent: May 18, 2021

(54) COA SUBSTRATE, DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Hongwei Du, Beijing (CN); Haoyue Du, Beijing (CN); Xianghua Jin, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 396 days.

(21) Appl. No.: 16/051,010

(22) Filed: Jul. 31, 2018

(65) Prior Publication Data

US 2019/0086592 A1    Mar. 21, 2019

(30) Foreign Application Priority Data

Sep. 20, 2017    (CN) .......................... 201710852395.1

(51) Int. Cl.
G02F 1/1362 (2006.01)
G02B 5/20 (2006.01)
G02F 1/1335 (2006.01)

(52) U.S. Cl.
CPC ....... *G02B 5/201* (2013.01); *G02F 1/133514* (2013.01); *G02F 1/136222* (2021.01); *G02F 1/136227* (2013.01); *G02F 2201/123* (2013.01)

(58) Field of Classification Search
CPC ... G02B 5/201; G02B 5/223; F02F 1/133512; F02F 1/133514; F02F 1/133516;
(Continued)

(56) References Cited

U.S. PATENT DOCUMENTS

| 2008/0074030 A1 | 3/2008 | Chu et al. |
| 2009/0079706 A1 | 3/2009 | Mishima et al. |

(Continued)

FOREIGN PATENT DOCUMENTS

| CN | 101398555 A | 4/2009 |
| CN | 104375313 A | 2/2015 |

(Continued)

OTHER PUBLICATIONS

Computer-generated translation of TW 201044056 (Dec. 2010). (Year: 2010).*

(Continued)

*Primary Examiner* — John A McPherson
(74) *Attorney, Agent, or Firm* — Brooks Kushman P.C.

(57) ABSTRACT

A COA substrate, a display panel, and a display device are provided. A pixel photoresist layer is arranged on a passivation layer of the COA substrate; an organic layer and a pixel electrode layer are sequentially arranged on the pixel photoresist layer; and each pixel electrode of the pixel electrode layer is configured to have a planar structure completely covering the organic layer; each planar pixel electrode is arranged with a through hole; and the through hole penetrates the pixel electrode layer.

20 Claims, 5 Drawing Sheets

(58) Field of Classification Search
CPC ........... F02F 1/136209; F02F 1/136227; F02F 2201/123; F02F 1/136222
USPC .............................................. 430/7; 349/106
See application file for complete search history.

(56) References Cited

U.S. PATENT DOCUMENTS

2017/0045767 A1   2/2017   Xu et al.
2018/0299723 A1   10/2018  Sun

FOREIGN PATENT DOCUMENTS

| CN | 104656325 A    |   | 5/2015  |
|----|----------------|---|---------|
| CN | 106094378 A    |   | 11/2016 |
| CN | 106324933 A    |   | 1/2017  |
| CN | 106773271 A    |   | 5/2017  |
| KR | 101038188 B1   |   | 6/2011  |
| TW | 201044056 A    | * | 12/2010 |

OTHER PUBLICATIONS

First Office Action for Chinese Application No. 201710852395.1, dated Oct. 31, 2019, 11 Pages.
Chen et al., "College Physics Handbook," Sep. 1, 1985, pp. 340-343 (4 Pages).

* cited by examiner

Direction A

Direction A

Direction A

COA SUBSTRATE, DISPLAY PANEL AND DISPLAY DEVICE

CROSS-REFERENCE TO RELATED APPLICATION

This application claims priority to Chinese Patent Application No. 201710852395.1 filed on Sep. 20, 2017, which is incorporated herein by reference in its entirety.

TECHNICAL FIELD

The present disclosure relates to the field of liquid crystal display technology, and in particular, to a COA substrate, a display panel, and a display device.

BACKGROUND

Display devices such as liquid crystal displays (LCDs) and organic electroluminescent devices (OLEDs) have become a necessity in people's lives. Meanwhile, as people's demands increase, to improve the display quality of a display device and avoid the problem that a deviation of an array substrate and a color film substrate, when oppositely arranged to from a cell, affects the aperture ratio of the display device and results in light leakage, Color Filter on Array (COA for short) just emerges, and this COA technology is intended to place a color photoresist layer (RGB) on an array substrate. Since the COA substrate has no problem of light leakage caused by alignment, it can effectively reduce the width of a black matrix, thereby increasing the pixel aperture ratio and further increasing panel transmittance.

On the one hand, the preparation of RGB in a COA substrate will increase the thickness of the entire substrate, which further brings about the problem of residual gas, especially for those resin materials with a large amount of out gas. The residual gas will not only damage display quality, but also greatly extend the time required for oppositely arranging an array substrate and a color filter substrate to form a cell.

On the other hand, when a COA substrate in the related art uses an IPS, TN, ADS or VA mode, generally a pixel electrode thereof is correspondingly arranged in a sheet-like manner according to the remaining hierarchical structures or can cover only a partial region of a single pixel, and such method is not conducive to cost reduction or mass production although it has characteristics.

Therefore, the COA substrate in the related art is not only disadvantageous in cost reduction and mass production, but also can hardly solve the problem of residual gas effectively.

SUMMARY

A COA substrate is provided in the present disclosure, where a pixel photoresist layer is arranged on a passivation layer of the COA substrate; an organic layer and a pixel electrode layer are sequentially arranged on the pixel photoresist layer; and a pixel electrode of the pixel electrode layer is planar and covers the organic layer; at least one through hole is arranged on the pixel electrode; and the through hole penetrates at least the pixel electrode layer.

Optionally, a plurality of through holes are arranged on the pixel electrode, and an interval of the through holes is calculated based on a minimum discriminable dot pitch of a human eye and a pixel width to length ratio.

Optionally, a minimum interval of the through holes is calculated as: $d=1.22\lambda \times L/D$; $L=S\times\theta$; where d is the minimum interval; $\lambda$ is a wavelength of incident light to the human eye; D is a pupil aperture of the human eye; L is the minimum discriminable dot pitch; S is a visual distance, $\theta$ is a human eye angular resolution; $1.22\lambda/D$ is a pixel width to length ratio.

Optionally, the pixel width to length ratio is 3/1 to 10/1.

Optionally, the through holes are arranged in an array form.

Optionally, an aperture size of the through hole is calculated as: $E=kq/(r/2)^2$; where E is a strength of an electric field, r is an aperture size, $(r/2)^2$ is an attenuation factor; k is a dielectric constant; q is the quantity of electric charge.

Optionally, a shape of the through hole is square, rectangular or circular.

Optionally, the pixel electrode is coupled to a drain electrode through a via hole; the through hole is spaced apart from the via hole.

Optionally, the pixel electrode is coupled to the drain electrode through a via hole, and an orthographic projection of the via hole onto the passivation layer is spaced apart from an orthographic projection of the through hole onto the passivation layer.

Optionally, along a direction perpendicular to the passivation layer and directed from the pixel electrode layer toward the passivation layer, a cross-sectional area of the through hole in a direction parallel to the pixel electrode layer is gradually reduced.

Optionally, the through hole penetrates the pixel electrode layer and the organic layer.

Optionally, the through hole further penetrates the pixel photoresist layer.

A display panel is further provided in the present disclosure, including the above COA substrate.

A display device is further provided in the present disclosure, including the above display panel.

DETAILED DESCRIPTION

In order to make the purpose, the technical solution and the advantages of the present disclosure clearer, the present disclosure will be further explained in detail in conjunction with specific examples and with reference to the accompanying drawings.

It is to be explained that all the expressions of "first" and "second" in the embodiments of the present disclosure are intended to distinguish two non-identical entities or parameters having the same name. Thus, "first" and "second" are only for the convenience of expression and should not be understood as a limit to the embodiments of the present disclosure, and this will not be described again in subsequent embodiments.

The present disclosure is directed to the problem existing in current COA substrates, and proposes a COA substrate using a full-face pixel electrode structure, which is especially suitable for the design and production of related flat screens and curved screens in the TFT-LCD industry. The present disclosure innovatively proposes an aperture design on a full-face pixel metal film of an array substrate, such that out gas of the resin material covered by the full-face pixel electrode layer and the residual gas in deep via holes, during the Cell ODF VAS process, can quickly be discharged or reach the gas dissolution point of liquid crystals, thereby effectively improving product yield and greatly improving production efficiency. Wherein, the specific shape and size design of the through hole aperture need to be determined according to the resolution and pixel size of different products, to avoid the difference of color gamut and the difference of viewing angle caused by the weakening of pixel driving. This is because the full-face pixel electrode layer structure proposed by the present disclosure can reduce cost and facilitate mass production, but also causes the problem that bubbles in the organic layer under the pixel electrode layer cannot be effectively eliminated. Therefore, it is necessary to correspondingly provide through holes in the full-face pixel electrode layer in the present disclosure. However, providing apertures on pixel electrodes necessarily causes the driving electric field to be weakened or causes an uneven electric field, resulting in grayscale chromatic aberration. Therefore, it is necessary to further set the aperture size and pitch according to human eye resolution requirements.

Figure 1:
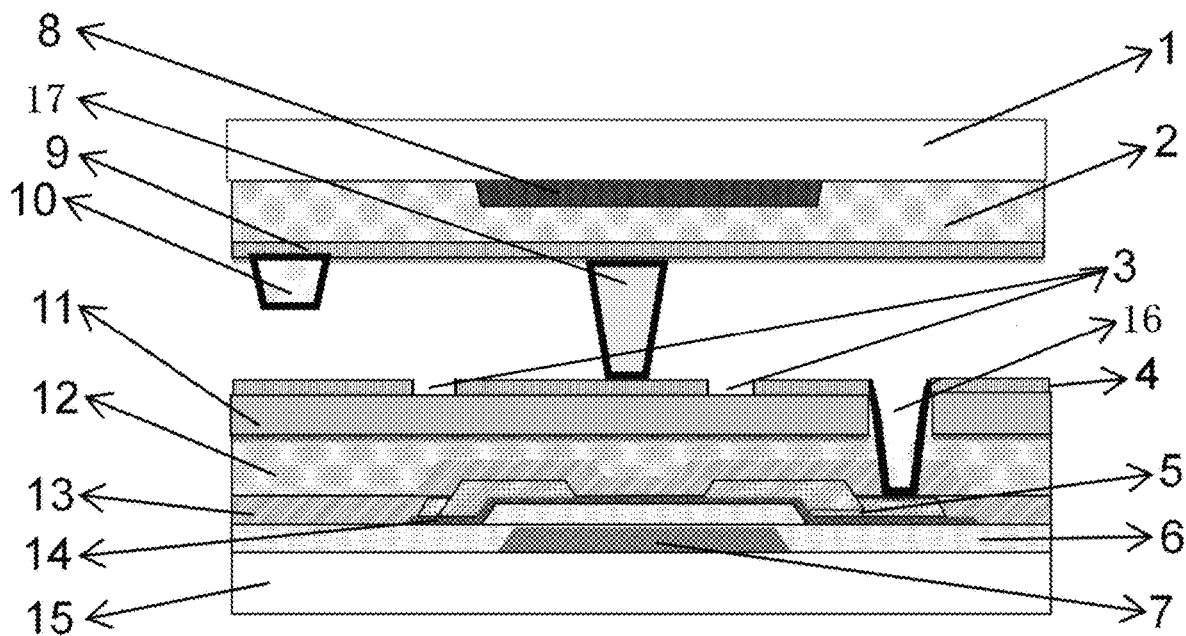
FIG. 1 is a cross-sectional view of a COA substrate in some embodiments of the present disclosure.
Figure 2:
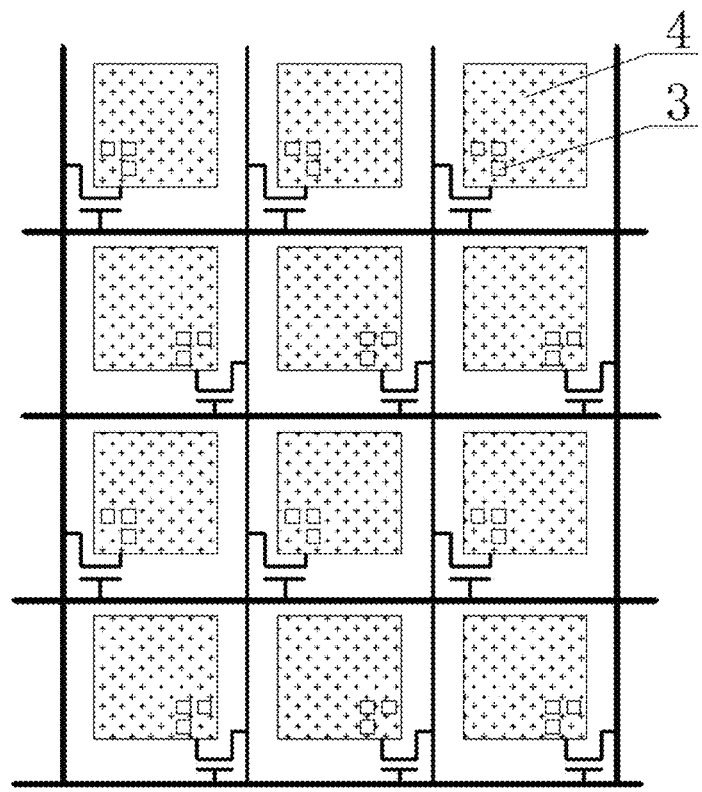
FIG. 2 is a plan view of a COA substrate in some embodiments of the present disclosure.

Specifically, referring to FIG. 1 and FIG. 2, which are a cross-sectional view and a plan view, respectively, in some embodiments of the present disclosure. A pixel photoresist layer 12 is arranged on a passivation layer 13 of the COA substrate; an organic layer 11 and a pixel electrode layer 4 are sequentially arranged on the pixel photoresist layer 12; each pixel electrode in the pixel electrode layer 4 is configured to have a planar structure completely covering the organic layer such that each pixel electrode becomes a full-face pixel electrode; each pixel electrode of the pixel electrode layers 4 is arranged with a through hole 3; and the through hole 3 penetrates the pixel electrode layer 4. More specifically, a display device is generally formed by a lower array (TFT) substrate, an upper color film (CF) substrate and an intermediate layer, which are oppositely arranged to form a cell; the TFT substrate 15 is arranged with a gate electrode layer 7, an insulating layer 6, and an active layer 14, a source/drain metal layer 5, a passivation layer 13, a pixel photoresist layer 12, an organic layer 11, and a pixel electrode layer 4 sequentially; the pixel electrode layer 4 is generally connected to the drain in the source/drain metal layer 5 through the via hole 16; the CF substrate 1 is arranged with a black matrix 8, a coating protective layer 2, a common electrode layer 9, a main support column 17, and an auxiliary support column 10 sequentially. Of course, shown in the figures is merely an alternative embodiment, and according to design requirements, the arrangement of various hierarchical structures on the substrate can also be correspondingly set to different forms, as long as the pixel photoresist layer 12 is arranged on the TFT substrate and each pixel electrode in the pixel electrode layer 4 completely covers the entire pixel region.

The present disclosure is mainly directed to the problem that a lot of bubbles exist when the added organic layer correspondingly uses resin material and the bubbles cannot be eliminated because the pixel electrode layer uses the full-face structure. Therefore, it is necessary to provide a through hole on the full-face pixel electrode layer such that bubbles in the organic layer may be smoothly discharged.

In addition, with respect to the problem that bubbles may also exist in the remaining hierarchical structures, an exhaust channel may also be arranged correspondingly for the remaining hierarchical structures, and bubbles are finally discharged through a through hole on the pixel electrode layer or the through hole is configured to directly penetrate a plurality of hierarchical structures.

Figure 10:
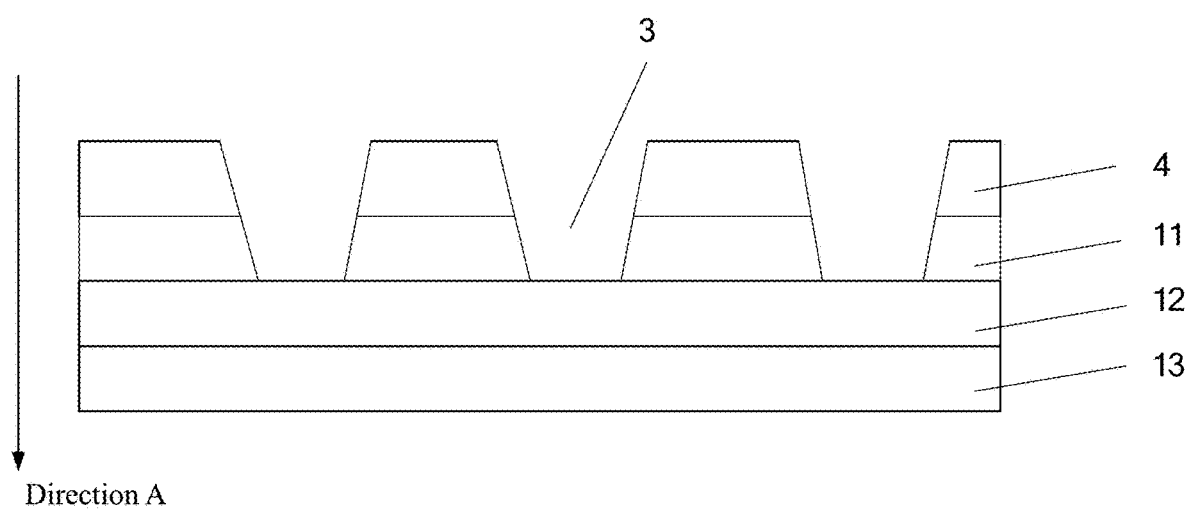
FIG. 10 is a cross-sectional view of a COA substrate in some embodiments of the present disclosure.

In some embodiments of the present disclosure, as shown in FIG. 10, the through hole 3 penetrates the pixel electrode layer 4 and the organic layer 11.

Figure 11:
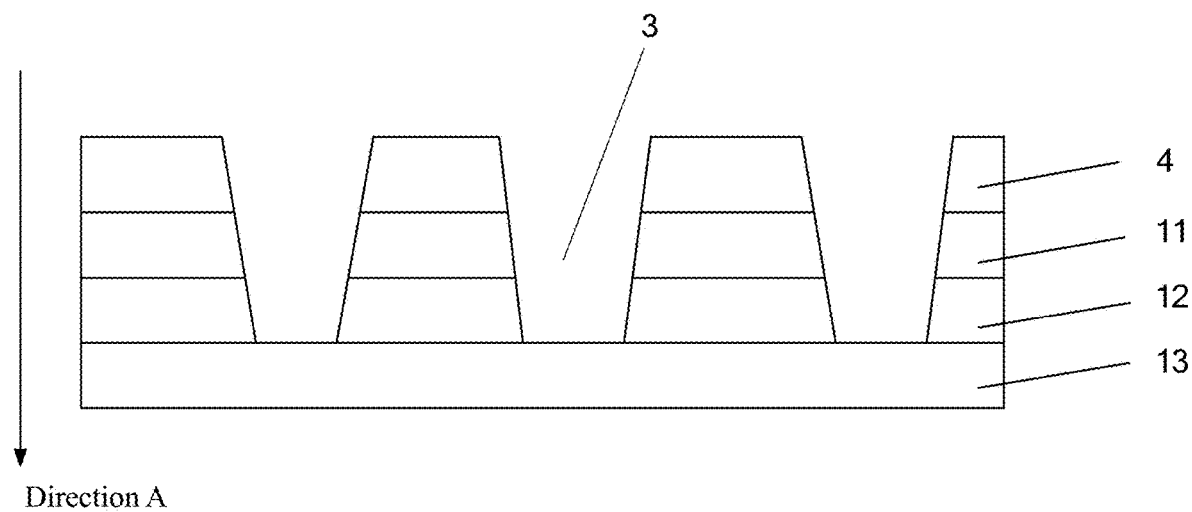
FIG. 11 is a cross-sectional view of a COA substrate in some embodiments of the present disclosure.

In some embodiments of the present disclosure, as shown in FIG. 11, the through hole 3 penetrates the pixel electrode layer 4, the organic layer 11, and the pixel photoresist layer 12.

In some embodiments of the present disclosure, by adding an organic layer 11 on the pixel photoresist layer 12 in the COA substrate, not only pixel electrodes may be made flatter, but also the parasitic capacitance between the pixel electrodes and the wiring may be effectively reduced; moreover, by configuring each pixel electrode in the pixel electrode layer 4 to have a planar structure that completely covers the organic layer, that is, making each pixel electrode a full-face pixel electrode, the preparation process becomes easier and takes less time, thereby reducing cost and further being conducive to mass production and popularization. In addition, by providing a through hole 3 on the full-face pixel electrode in the COA substrate and making the through hole 3 penetrate the pixel electrode layer 4 such that bubbles in the organic layer may be smoothly discharged through the through hole 3, not only the quality is improved but the time taken by subsequent processes is also reduced. Therefore, the COA substrate of the present disclosure may not only reduce cost so as to facilitate mass production, but also effectively solve the residual gas problem.

In some embodiments of the present disclosure, the full-face pixel electrode is a transparent conductive film, and the material is ITO.

In some embodiments of the present disclosure, the depth of through holes in common products is approximately 4400 Å (1 μm=10,000 Å), and in the present disclosure, as an organic layer and a pixel photoresist layer are added on the TFT substrate, the depth of through holes on the TFT substrate reaches above 40,000 Å, considering again the large amount of out gas of the resin material, especially when the organic layer usually uses a resin material. When the outgassing rate is slow, the time for performing the alignment process using Vacuum Alignment System (VAS) is greatly increased. Therefore, the problem of degassing on the TFT substrate in the present disclosure cannot be ignored.

In some embodiments of the present disclosure, an alignment time calculation formula is as follows:

VAS Time=$120 \times (Sd/271000 + Sh/346)/2$; where Sd is the aperture area of the pixel electrode layer, and Sh is the aperture area of the through hole in the passivation layer. It may be seen from the analysis of the above embodiment and formula that increasing apertures of the full-face pixel electrode layer can effectively improve the discharge efficiency of out gas. That is, since the full-face pixel electrode hinders the discharge of bubbles in the underlying organic layer, it is necessary to provide an aperture in the full-face pixel electrode to accelerate the degassing rate.

In some embodiments of the present disclosure, a plurality of said through holes are arranged, and the interval of the through holes is calculated according to a minimum human eye discriminable dot pitch and a pixel width to length ratio. Further, the minimum interval of the through holes is calculated as: d=1.22λ×L/D; L=S×θ; where d is a minimum interval; λ is the wavelength of incident light to the human eye; D is human eye pupil aperture; L is a minimum discriminable dot pitch; S is a visual distance, θ is a human eye angular resolution; 1.22λ/D is a pixel width to length ratio. Optionally, the human eye angular resolution is generally 20 arc seconds to 1 arc minutes (1 arc minutes=0.000291 radians). Taking the visual distance of 30 cm of an MNT product as an example, L is equal to 29.1 μm. Therefore, the aperture size of the through hole in the pixel electrode layer should be less than 29 μm; in addition, the width/length ratio of the general pixel design is 3/1, that is, 1.22λ/D is equal to 3, and the interval of the through hole may be obtained to be greater than 3×29=87 μm. Of course, the calculation may also be made based on actual parameters. For example, taking a Monitor product as an example, if the parameter λ is equal to 550 nm, D is equal to 3 mm, and L is equal to 60 cm, then the minimum interval may be obtained by calculation to be 130 μm.

Providing an aperture on the pixel electrode layer affects the electric field of the pixel electrode, causing problems such as chromatic aberration. Therefore, it is necessary to calculate the resolution peak which causes human eye Mura (a visual defect caused by chromatic aberration, grayscale difference) by means of color gamut simulation according to the minimum human eye resolution, and the resolution peak is usually 0.15ΔEab. Thus, even if various problems such as chromatic aberration are caused by through holes, as these difference variations exceed the range of human eye recognition, the external appearance thereof will not lower the user's viewing effect.

In some embodiments of the present disclosure, the parameter corresponding to the pixel width to length ratio in the interval calculation formula is 3/1 to 10/1. Depending on the pixel design, different pixel width to length ratios may be set accordingly. For example, when the RGB format is used, the pixel width to length ratio is usually set to 3/1, and when the WRGB format is used, the pixel width to length ratio may be set to 4/1.

In some embodiments of the present disclosure, the shape of the through holes is square, rectangular or circular.

In some embodiments of the present disclosure, the through holes are arranged uniformly in an array form.

Figure 6:
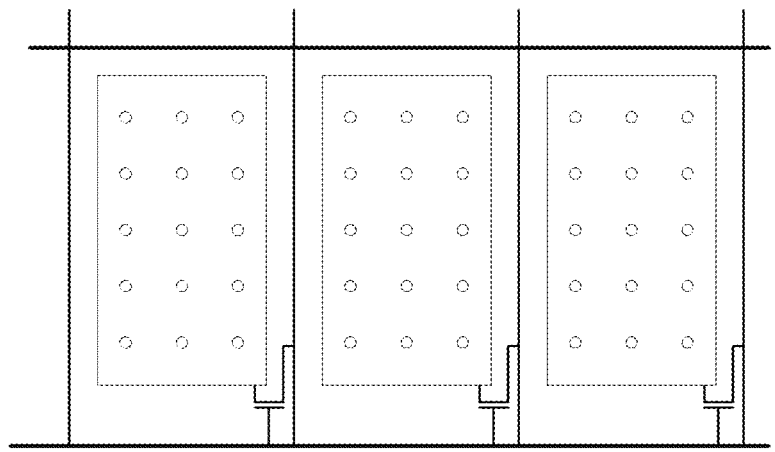
FIG. 6 is a schematic plan view of a COA substrate having circular through holes in some embodiments of the present disclosure.
Figure 7:
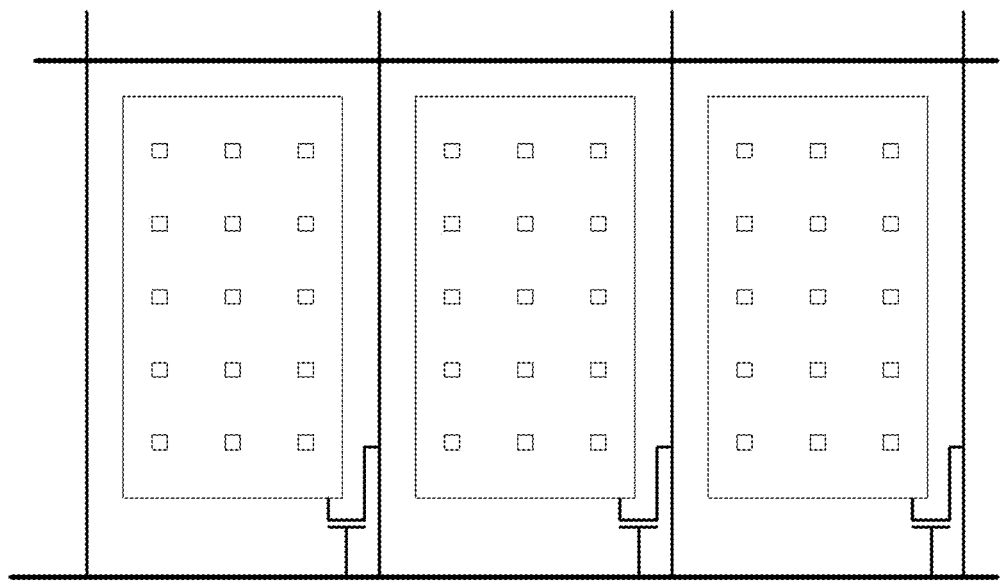
FIG. 7 is a schematic plan view of a COA substrate having square through holes in some embodiments of the present disclosure.
Figure 8:
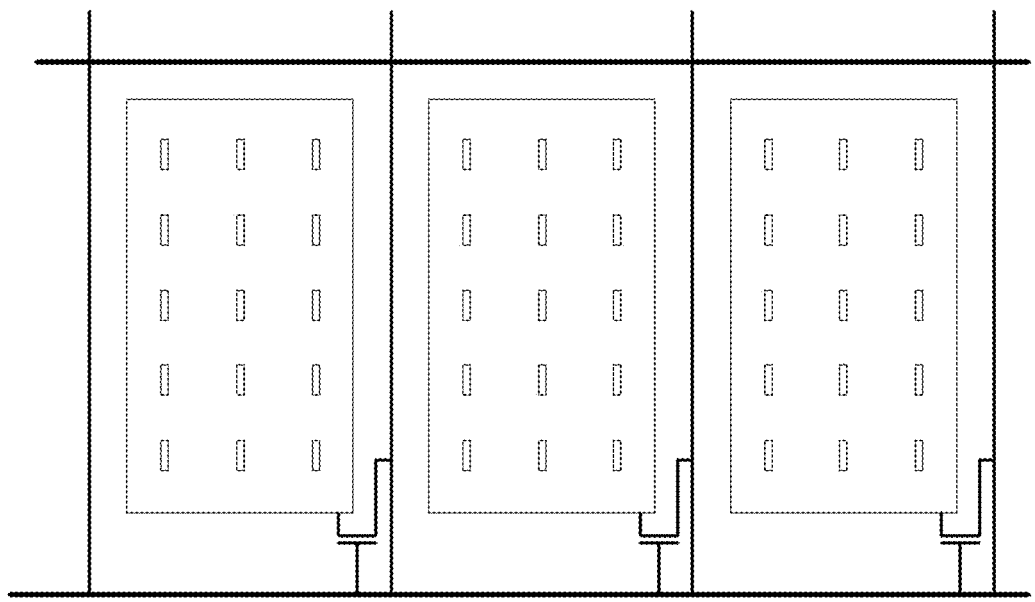
FIG. 8 is a schematic plan view of a COA substrate having rectangular through holes in some embodiments of the present disclosure.

Referring to FIGS. 6-8, which are respectively schematic plan view of a through hole using a circular, square, or rectangular structure arranged in some embodiments of the present disclosure.

In some embodiments of the present disclosure, the aperture size of the through hole is calculated as: E=kq/(r/2)^2; wherein E is the strength of an electric field, r is an aperture size, (r/2)^2 is an attenuation factor; k is a dielectric constant; q is the quantity of electric charge. The attenuation factor indicates that after an aperture is arranged on the pixel electrode layer, the electric field in the blank does not disappear under the influence of the surrounding electric field, but decreases as the blank length increases, and based on the electric field calculation formula, since the aperture is arranged inside the full-face pixel electrode, the aperture is subjected to a bilateral electric field. Among them, the electric field is calculated as follows: according to the V-T characteristics of liquid crystal molecules, that is, the relationship between voltage and transmittance:

$$\tau = \frac{1}{2}\varepsilon_0(\varepsilon_\parallel - \varepsilon_\perp)\left(\frac{V_{AC}}{d}\right)\sin 2\theta;$$

it may be seen from the formula that the shape of the aperture in the electric field of the full-face pixel electrode layer does not directly affect the electric field, that is, does not cause a broken circuit of the electric field. Therefore, the pixel aperture size in the present disclosure may be designed correspondingly without affecting pixel driving.

Figure 9:
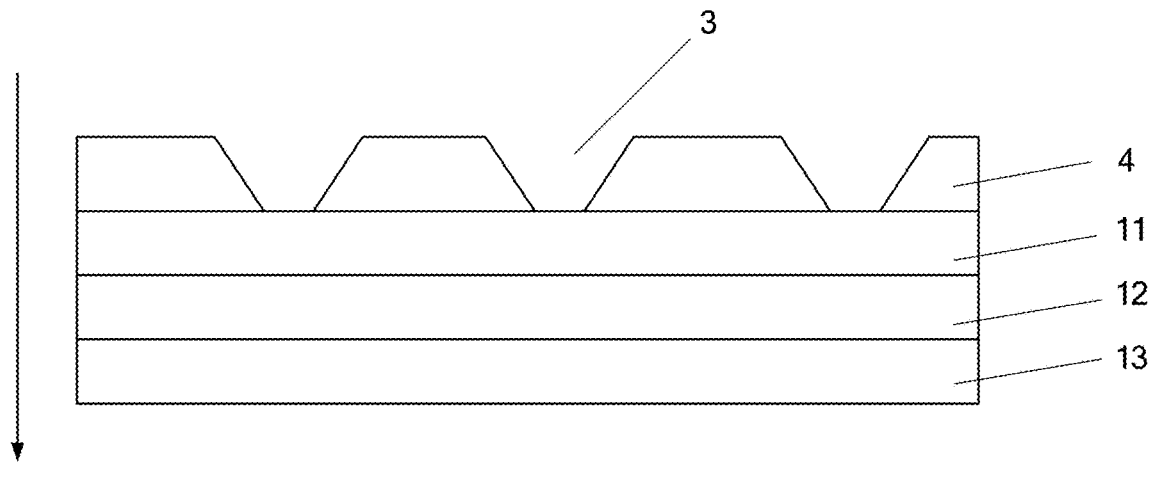
FIG. 9 is a cross-sectional view of a COA substrate in some embodiments of the present disclosure.

In some embodiments of the present disclosure, as shown in FIG. 9, FIG. 10 and FIG. 11, along a direction A perpendicular to the passivation layer 13 and directed from the pixel electrode layer 4 toward the passivation layer 13, the cross-sectional area of the through hole 3 in a direction parallel to the pixel electrode layer 4 is gradually reduced.

In some embodiments of the present disclosure, the through hole is gradually reduced in diameter from an upper end surface of the pixel electrode toward a lower end surface of the pixel electrode, such that the through hole has a tapered structure. This enables gas to be eliminated more easily. For such a structure, its effect on degassing may be derived accordingly by calculating the volume of the via hole. The volume of the through hole is calculated as: V=1/3πh(R2+Rr+r2); where h is the height, r is the radius of the upper circle, and R is the radius of the lower circle.

In some embodiments of the present disclosure, the pixel electrode is coupled to the drain through the via hole 16; the through hole 3 is spaced apart from the via hole 16. In this way, it is possible to prevent the through hole 3 from damaging the via hole connection and affecting product quality.

In some embodiments of the present disclosure, as shown in FIG. 1, the orthographic projection of the via hole 16 on the passivation layer 13 does not overlap with the orthographic projection of the through hole 3 on the passivation layer 13.

Figure 3:
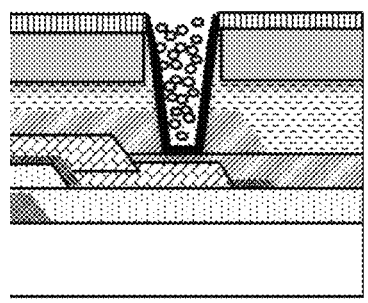
FIG. 3 is a schematic view showing a bubble change state 1 in a via hole in the related art.
Figure 4:
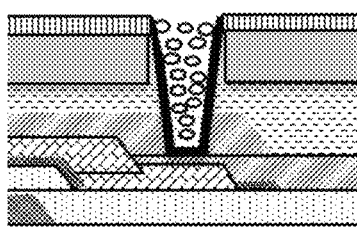
FIG. 4 is a schematic view showing a bubble change state 2 in a via hole in the related art.
Figure 5:
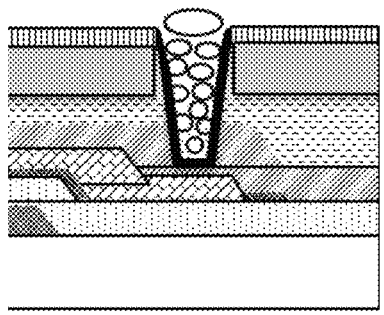
FIG. 5 is a schematic view of a bubble change state 3 in a via hole in the related art.

Referring to FIGS. 3-5, which are schematic views of bubble change states 1-3 in via holes in the related art. According to these three state change diagrams, small bubbles in respective layers will eventually form a macroscopic bubble in the process of continuous upward aggregation, which, if not eliminated, will affect the display effect. It can also be seen that the design of the through holes in the present disclosure can speed up the elimination of bubbles and ultimately improve the quality of corresponding products.

A display panel is further provided in some embodiments of the present disclosure, including the above COA substrate.

A display device is further provided in some embodiments of the present disclosure, including the above display panel.

Since the display panel or the display device includes the COA substrate, it has the same effects as the COA substrate, and the detailed description thereof will not be repeated here.

It should be understood by those of ordinary skill in the art that the discussion of any of the above embodiments is merely exemplary and is not intended to suggest that the scope of the disclosure (including the claims) is limited to these examples; under the idea of the present disclosure, the technical features of the embodiments above or different embodiments can also be combined, the steps may be carried out in any order, and there are many other variations of the various width to lengths of the present disclosure, which are not arranged in detail for the sake of brevity.

In addition, to simplify illustration and discussion and not to obscure the present disclosure, well known power/ground connections to integrated circuit (IC) chips and other components may or may not be shown in the arranged figures. Furthermore, the device may be shown in the form of a block diagram in order to avoid obscuring the present disclosure, and this also takes into account the fact that the details of the embodiment of the device shown in the block diagram are highly dependent on the platform on which the present disclosure is to be implemented (i.e. these details should be well understood by those skilled in the art). In the case where the specific details (e.g., circuits) are set forth to describe the exemplary embodiments of the present disclosure, it will be apparent to those skilled in the art that the present disclosure may be implemented without these specific details or in the case where these specific details change. Accordingly, the description should be considered as illustrative and not restrictive.

Although the present disclosure has been described in conjunction with the specific embodiments of the present invention, many substitutions, modifications and variations of the embodiments are apparent to those of ordinary skill in the art. For example, other memory architecture (e.g., dynamic RAM (DRAM)) may use the embodiments discussed.

The embodiments of the present disclosure are intended to encompass all such substitutions, modifications, and variations which fall within the broad scope of the appended claims. Therefore, any omissions, modifications, equivalent substitutions, improvements, etc., which are made within the spirit and scope of the present disclosure are intended to be included within the scope of protection of the present disclosure.

What is claimed is:

1. A COA substrate, wherein a pixel photoresist layer is arranged on a passivation layer of the COA substrate; an organic layer and a pixel electrode layer are sequentially arranged on the pixel photoresist layer; and a pixel electrode of the pixel electrode layer is planar and covers the organic layer; at least one through hole is arranged on the pixel electrode; and the through hole penetrates at least the pixel electrode layer;

wherein a plurality of through holes are arranged on the pixel electrode, and an interval of the through holes is calculated based on a minimum discriminable dot pitch of a human eye and a pixel width to length ratio.

2. The COA substrate according to claim 1, wherein a minimum interval of the through holes is calculated as: $d=1.22\lambda \times L/D$;

$$L = S \times \theta;$$

wherein d is the minimum interval; $\lambda$ is a wavelength of incident light to the human eye; D is a pupil aperture of the human eye; L is the minimum discriminable dot pitch; S is a visual distance, $\theta$ is a human eye angular resolution; $1.22\theta/D$ is a pixel width to length ratio.

3. The COA substrate according to claim 2, wherein the pixel width to length ratio is 3/1 to 10/1.

4. The COA substrate according to claim 1, wherein the through holes are arranged in an array form.

5. The COA substrate according to claim 1, wherein an aperture size of the through hole is calculated as: $E=kq/(r/2)^2$; wherein E is a strength of an electric field, r is an aperture size, $(r/2)^2$ is an attenuation factor; k is a dielectric constant; q is the quantity of electric charge.

6. The COA substrate according to claim 1, wherein a shape of the through hole is square, rectangular or circular.

7. The COA substrate according to claim 1, wherein the pixel electrode is coupled to a drain electrode through a via hole; the through hole is spaced apart from the via hole.

8. The COA substrate according to claim 1, wherein the pixel electrode is coupled to the drain electrode through a via hole, and an orthographic projection of the via hole onto the passivation layer is spaced apart from an orthographic projection of the through hole onto the passivation layer.

9. The COA substrate according to claim 1, wherein along a direction perpendicular to the passivation layer and directed from the pixel electrode layer toward the passivation layer, a cross-sectional area of the through hole in a direction parallel to the pixel electrode layer is gradually reduced.

10. The COA substrate according to claim 1, wherein the through hole penetrates the pixel electrode layer and the organic layer.

11. The COA substrate according to claim 10, wherein the through hole further penetrates the pixel photoresist layer.

12. A display panel comprising the COA substrate according to claim 1.

13. A display device comprising the display panel according to claim 12.

14. A COA substrate, wherein a pixel photoresist layer is arranged on a passivation layer of the COA substrate; an organic layer and a pixel electrode layer are sequentially arranged on the pixel photoresist layer; and a pixel electrode of the pixel electrode layer is planar and covers the organic layer; at least one through hole is arranged on the pixel electrode; and the through hole penetrates at least the pixel electrode layer;

wherein an aperture size of the through hole is calculated as: $E=kq/(r/2)^2$; wherein E is a strength of an electric field, r is an aperture size, $(r/2)^2$ is an attenuation factor; k is a dielectric constant; q is the quantity of electric charge.

15. The COA substrate according to claim 14, wherein a plurality of through holes are arranged on the pixel electrode in an array form.

16. The COA substrate according to claim 14, wherein the pixel electrode is coupled to a drain electrode through a via hole; the through hole is spaced apart from the via hole.

17. The COA substrate according to claim 14, wherein the pixel electrode is coupled to the drain electrode through a via hole, and an orthographic projection of the via hole onto the passivation layer is spaced apart from an orthographic projection of the through hole onto the passivation layer.

18. A COA substrate, wherein a pixel photoresist layer is arranged on a passivation layer of the COA substrate; an organic layer and a pixel electrode layer are sequentially arranged on the pixel photoresist layer; and a pixel electrode of the pixel electrode layer is planar and covers the organic layer; at least one through hole is arranged on the pixel electrode; and the through hole penetrates at least the pixel electrode layer;

wherein along a direction perpendicular to the passivation layer and directed from the pixel electrode layer toward the passivation layer, a cross-sectional area of the through hole in a direction parallel to the pixel electrode layer is gradually reduced.

19. The COA substrate according to claim 18, wherein the through hole penetrates the pixel electrode layer and the organic layer.

20. The COA substrate according to claim 18, wherein a plurality of through holes are arranged on the pixel electrode in an array form.

* * * * *